(12) United States Patent
Kaiser et al.

(10) Patent No.: US 7,686,564 B2
(45) Date of Patent: Mar. 30, 2010

(54) PALLETIZING DEVICE

(75) Inventors: Alexander Kaiser, Rain (DE); Johann Haupt, Freising (DE)

(73) Assignee: Krones AG, Neutraubling (DE)

( * ) Notice: Subject to any disclaimer, the term of this patent is extended or adjusted under 35 U.S.C. 154(b) by 125 days.

(21) Appl. No.: 10/575,918

(22) PCT Filed: Oct. 1, 2004

(86) PCT No.: PCT/EP2004/010968

§ 371 (c)(1),
(2), (4) Date: Sep. 21, 2006

(87) PCT Pub. No.: WO2005/037685

PCT Pub. Date: Apr. 28, 2005

(65) Prior Publication Data

US 2007/0119687 A1    May 31, 2007

(30) Foreign Application Priority Data

Oct. 14, 2003   (DE) .............................. 103 48 431

(51) Int. Cl.
   *B65G 57/22* (2006.01)
(52) U.S. Cl. .................................. 414/791.6
(58) Field of Classification Search ............ 198/377.03, 198/377.07, 378, 418.6, 597, 614, 793, 803.16, 198/803.3; 209/903; 414/789.8, 791.6, 792.8, 414/792.9, 793.4, 794.2, 794.3, 799; 53/447, 53/539, 540, 543
See application file for complete search history.

(56) References Cited

U.S. PATENT DOCUMENTS

| 2,864,516 | A | * | 12/1958 | Rogers | 414/348 |
| 3,780,884 | A | * | 12/1973 | Jones | 414/793 |
| 4,259,826 | A | * | 4/1981 | Campbell | 53/543 |
| 4,651,879 | A | * | 3/1987 | Harris et al. | 209/523 |
| 5,060,455 | A | * | 10/1991 | Schmeisser | 53/448 |
| 5,868,549 | A | * | 2/1999 | Lee et al. | 414/791.6 |
| 6,196,788 | B1 | * | 3/2001 | Talbot et al. | 414/802 |
| 6,308,817 | B1 | * | 10/2001 | Corniani et al. | 198/419.3 |
| 6,591,967 | B1 | * | 7/2003 | Doudement et al. | 198/450 |
| 2003/0168314 | A1 | * | 9/2003 | Correggi et al. | 198/432 |

FOREIGN PATENT DOCUMENTS

| DE | 3007104 | 9/1981 |
| DE | 3235223 | 3/1984 |
| DE | 19535907 | 4/1997 |
| DE | 29913237 U | 12/2000 |
| EP | 0939044 | 9/1991 |
| EP | 0726216 | 8/1996 |
| EP | 1073598 | 2/2001 |
| FR | 2147004 | 3/1973 |

* cited by examiner

*Primary Examiner*—Gregory W Adams
(74) *Attorney, Agent, or Firm*—Marshall, Gerstein & Borun LLP

(57) ABSTRACT

A device for palletizing objects containing a buffer device and a conveyor zone on which are provided a transposing device for assembling a layer and a pallet loader. To equip the device with effective buffering in a simple design, the conveyor zone and the buffer could optionally be loaded by the transposing device and optionally unloaded by the pallet loader.

20 Claims, 6 Drawing Sheets

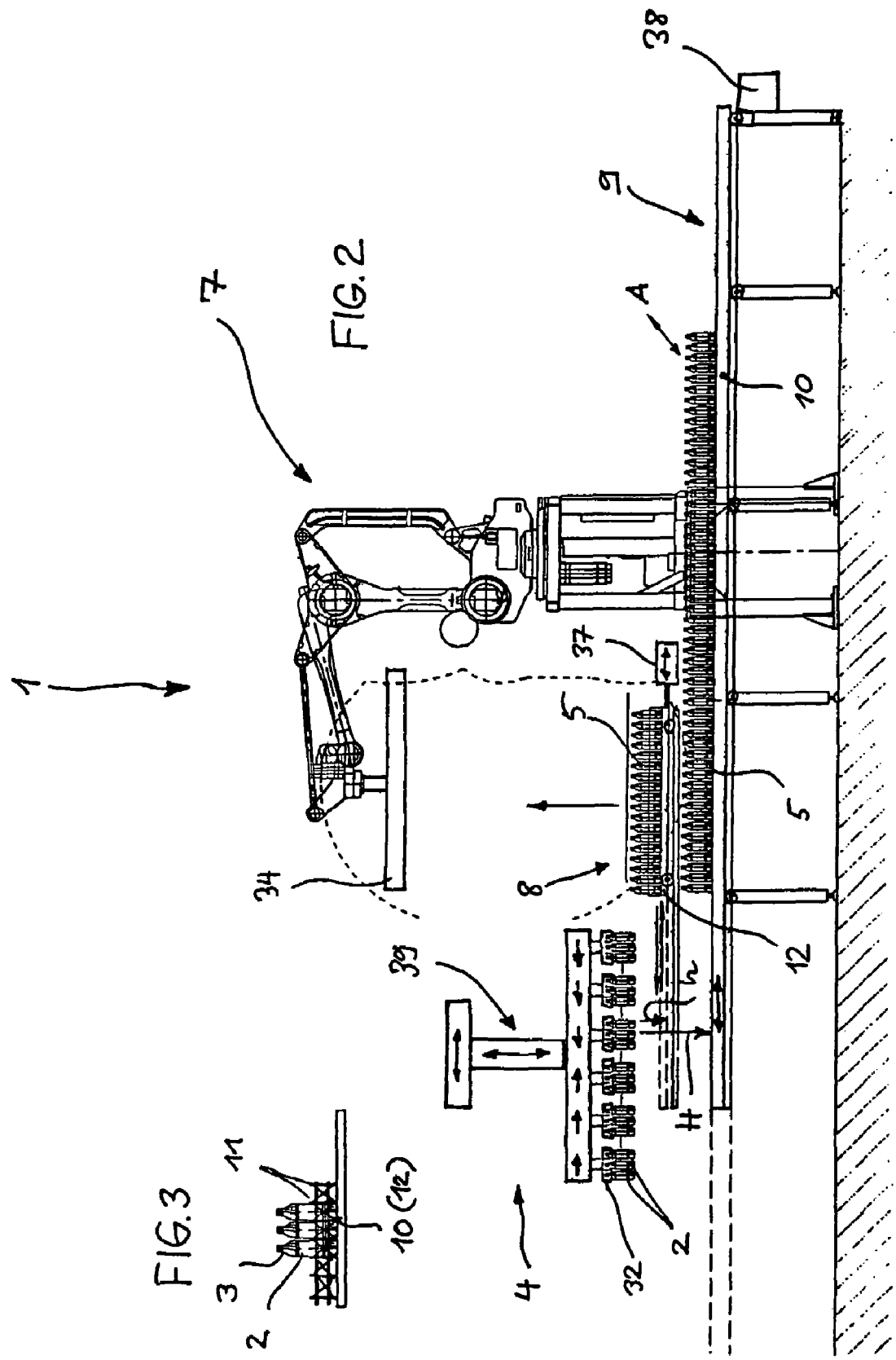

PALLETIZING DEVICE

CROSS-REFERENCE TO RELATED APPLICATION

This is the U.S. national stage under 35 U.S.C. §371, of international application no. PCT/EP2004/010968, having an international filing date of Oct. 1, 2004, and claims priority to German application no. 103 48 431.0 filed on Oct. 14, 2003.

FIELD OF THE INVENTION

The disclosure relates to a palletizing device.

BACKGROUND OF THE INVENTION

Such a device is known from European Patent 1 073 598, for example. The known palletizing device has a conveyor zone for the objects being palletized, namely bottles, leading from a delivery device to a pallet loader. The bottles are conveyed from a bottle producer to a collecting and transposing device where they are grouped and accommodated as a group, i.e., palletizing layer in an intermediate carrier. The intermediate carriers filled with bottles then go over a conveyor zone to the pallet loader, where they are stacked in layers on a pallet, with or without the intermediate carrier(s). Between the collecting and transposing device and the pallet loader, there are inlets and outlets leading to an intermediate storage for loaded intermediate carriers. The intermediate carrier is equipped with a shelf conveyor which takes the loaded intermediate carriers to the shelving of the intermediate storage and fetches them from the shelving for reintroduction into the conveyor zone. Such a device is relatively complicated and is profitable only in cases where large quantities of objects must be stored temporarily, possibly for longer periods of time.

A palletizing device having a similar intermediate storage is known from German Utility Model DE U 299 13 237. The intermediate storage of this conveyor device is formed by a suitably dimensioned grouping device for assembling objects into groups on the one hand and for collecting these groups on intermediate carriers or trays. In addition, another storage having a larger capacity is also provided, this one being loaded by the grouping device. Objects are introduced onto the conveyor belt and removed from it at different branch points of the conveyor zone that are passed on the way to the pallet loader.

Finally, German Patent DE A 32 35 223 discloses a device for transporting containers, e.g., bottle boxes, through treatment stations between which buffer magazines are provided at various locations in the conveyor zone; the containers holding the intermediate carriers are raised upward out of the conveyor zone in these buffer magazines so that they can pass through the downstream intermediate carriers.

The object of the present disclosure is to create a device for palletizing objects equipped with an effective buffer device of a simple design.

With an inventive palletizing device, no special input and output devices for the buffer are required because of the "double function" of transposing device and pallet loader, which cooperate directly with the normal conveyor zone as well as with the buffer. Therefore, the result is a compact and inexpensive design that functions reliably.

The distributor device should be mentioned in particular; it permits reliable loading of the transposing device with multiple rows of objects, formed from an outgoing single row emerging at a high speed from a manufacturing machine, e.g., a blow molding machine for PET bottles. This distributing device can also be used to advantage with other palletizing devices or the like.

BRIEF DESCRIPTION OF THE DRAWINGS

An exemplary embodiment of the present disclosure is described in greater detail below on the basis of the drawings, in which:

FIG. 2 shows a schematic side view of the palletizing device according to FIG. 1;

FIG. 3 shows the detail A from FIG. 2 on an enlarged scale;

DETAILED DESCRIPTION OF THE DISCLOSURE

Figure 1:
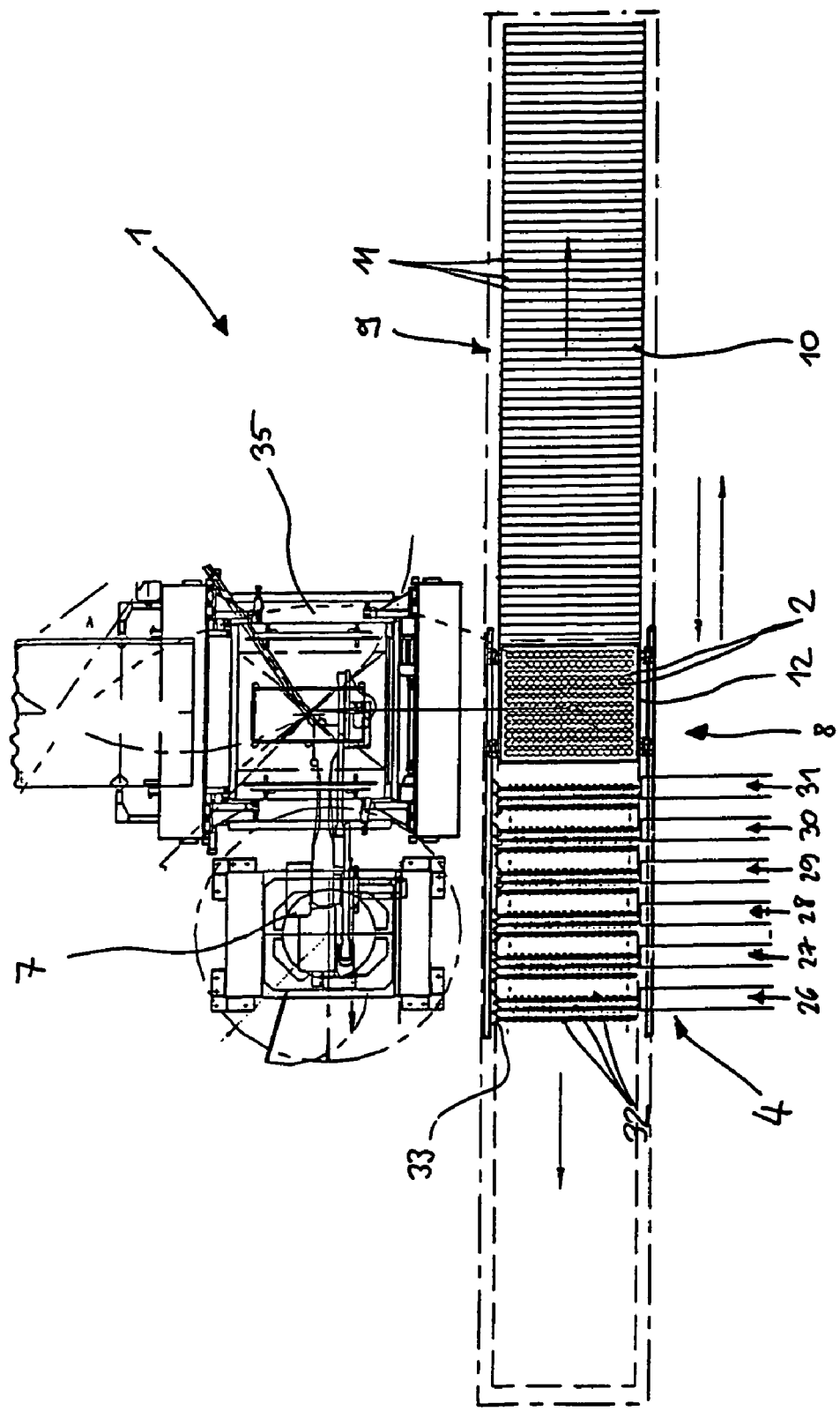
FIG. 1 shows a schematic view of the palletizing device from above.

The device 1 according to FIGS. 1 through 5 is equipped for palletizing empty PET bottles having a neck collar 3, hereinafter referred to simply as bottles 2, following their manufacture in a blow molding machine S of the traditional design. It comprises essentially a distributor 13, a transposing device 4, a normal conveyor zone 8, a buffer 9 arranged parallel thereto and a pallet loader 7.

The blow molding machine S is equipped with a linear oven 14, a transfer star 15, a blow wheel 16 and a discharge star wheel 17. These elements are driven continuously in the direction of the arrow, with 50,000 bottles emerging per hour in a row from the discharge star wheel 17, for example.

The distributor 13 has an endless conveyor chain 18 which cooperates directly with the discharge star wheel 17 of the blow molding machine S. The conveyor chain 18 is equipped with elastic gripper tongs 19 uniformly on its circumference, these gripper tongs gripping the freshly blow-molded bottles 2 individually one after the other from the controlled gripper tongs (not shown) of the discharge star wheel 17. The conveyor chain 18 is driven in the direction of the arrow in synchronization with the discharge star wheel 17 and cooperates with two gripper star wheels 20 and 21, revolving in synchronization with them and taking every second bottle 2 from the conveyor chain 18. The gripper star wheels 20, 21 are each provided with controllable grippers (not shown). Two synchronously driven gripper star wheels 22, 23 and/or 24, 25 are in turn assigned to each gripper star wheel 20, 21 and together with the bottles 2 emerging directly from the gripper star wheels 20, 21, they accomplish a distribution among a total of six paths 26 through 31, which are designed as air conveyors or conveyor belts, for example, and carry the bottles 2 at approximately ⅙ of the original speed to the transposing device 4. The design of the gripper star wheels 20 through 25 is described in detail in European Patent EP 726 216 B2. The distributor 13 also permits trouble-free distribution of the bottles 2 that are fed in a single row to any desired number of rows and is suitable for other applications and accomplishes this within a short distance and even at an extremely high output.

In the transposing device 4, a complete palletizing layer 5 of, for example, 12 rows each with 18 bottles 2 is formed from the stream of bottles 2 that is supplied to it in six paths. To this end, the transposing device 4 is equipped with six groups of three strip grippers 32, which can be moved jointly in vertical and horizontal directions by means of a drive mechanism 39 and can be moved by groups horizontally in relation to one another. The controllable strip grippers 32 form a type of guide channel which holds the bottles below the neck collar 3 or releases them and they are provided with offset stops 33 on the ends remote from the paths 26 through 31. The paths 26 through 31 are provided with controllable barriers (not shown) at the end. These barriers are opened so that 18 bottles 2 are counted out from the paths 26 through 31 and are inserted by air pressure or the like directly into the six strip grippers 32 standing directly in front of the paths. Then all of the strip grippers 32 are displaced by one bottle's width and another row of bottles is inserted. The same operating cycle is repeated again, so that ultimately all 18 strip grippers 32 have been filled with the desired number of bottles 2.

The pallet loader 7 is based on a robot and has a conventional gripper head 34 for a layer 5 of bottles 2. A lifting gear 35 for the pallet 6 to be loaded is assigned to the pallet loader 7, having guides at the side for the pallet 6 and an inserter (not shown) for a securing strip 36. The pallet loader 7 picks up the layers 5 assembled by the transposing device 4 one after the other at a holding place and sets them down on the pallet and/or the layer 5 already present there, with the pallet 6 being moved downward incrementally until the desired number of layers has been arranged on the pallet 6. At the same time the securing strip 36 is applied to the stack and in conclusion is attached, i.e., connected to the top side of the last layer. Then the filled pallet 6 is moved out of the lifting gear 35 and a new empty pallet 6 from a pallet magazine (not shown) is inserted and raised into the upper end position illustrated in FIG. 4. No palletizing can be performed during this period of so-called pallet changing.

A short conveyor zone 8 with a sliding table 12 is situated between the transposing device 4 and the pallet loader 7—or, more precisely, between the normal parking station of the transposing device 4 and the normal receiving station of the pallet loader 7. The sliding table 12 which holds the complete layer 5 can be moved horizontally between two end positions by an actuator motor 37. In the right end position, shown with solid lines in FIG. 2, it is at the normal receiving station of the pallet loader 7, i.e., it defines it. In the left end position, which is directly next to the former and is indicated with dotted lines in FIG. 2, the sliding table 12 is beneath the strip gripper 32 of the transposing device 4 in its normal parking station, i.e., defining it.

During the loading of a pallet 6, the sliding table 12 moves back and forth between the parking station of the transposing device 4 and the receiving station of the pallet loader 7, transporting a palletizing-ready layer 5 from the transposing device to the palletizer 7, where it is picked up by its gripper head 34. There is no time loss here because while one layer 5 is being set down on the pallet 6, in three working cycles in the manner described above, the transposing device 4 is forming a new layer and compressing it and setting it down on the sliding table 12 in its left end position. If necessary, the gripper head 34 of the pallet loader 7 is designed in the known way so that it brings the rows of a layer so close together during conversion of a layer 5 so that a closed "spherical packing" of the bottles 2 is obtained. This procedure may also take place in the transposing device 4 through appropriate relative movements of the strip gripper 25 entirely or partially.

A buffer 9 for intermediate storage of multiple layers 5, especially during the downtime of the pallet layer 7 due to changing pallets, is arranged beneath the conveyor zone 8. The buffer 9 has a table-like carriage 10 on which several layers 5 can be placed side-by-side. The carriage 10 can be moved back-and-forth horizontally like the sliding table 12 but at a lower level, with a height distance of slightly more than the maximum bottle height. The reversing drive of the carriage 10 is accomplished by a motor 38 by means of gear elements (not shown) such as toothed rods, endless traction means, spindles or the like.

The path of movement of the carriage 10 thus runs at a slight distance below the normal parking station of the transposing device 4 and the normal receiving station of the pallet loader 7. The buffer 9 is thus effectively connected in parallel with the conveyor zone 8.

The buffer 9 is loaded by the transposing device 4 by a method similar to the loading of the sliding table 12 by the fact that the strip gripper 32 of the transposing device 4 executes a longer set-down stroke, indicated by the arrow H in comparison with the normal set-down stroke, indicated by the arrow h after collecting a complete layer 5 and in doing so sets down a complete layer 5 on the stationary carriage 10. The sliding table 12 here assumes its end position at the right. In doing so, the rows of bottles are adjusted between supports 11 in the form of narrow strips or the like arranged adjustably across the direction of movement of the carriage 10 to reliably secure the bottles while they remain in the buffer and while they are being removed. The sliding table 12 may also be provided with appropriate supports 11.

The buffer 9 is unloaded by the pallet loader 7 in that its gripper head 34 is lowered to a position lower than normal corresponding to the height difference between the conveyor belt 8 and the buffer 9. Therefore, no additional equipment is needed for loading or unloading the buffer 9 and the additional lift (H minus h) can be implemented exclusively through corresponding controls on the drives for the strip grippers 32 and/or the gripper head 34.

The function of the device 1 described above is as follows: at the start of operation, after raising the empty pallet 6 in the lifting gear 35 to the starting position illustrated in FIG. 4 and after starting operation of the blow molding machine S, the bottles 2 produced by it are distributed among six paths in the distributor 13, sent to the transposing device 4 and combined by this during three working cycles to form one complete layer 5 and set down on the sliding table 12 by lowering the strip grabbers 32 (lift h) while it is in its end position at the left. Then the sliding table 12 is moved to the right to the normal receiving station of the pallet loader 7, after which the respective layer 5 is gripped by the gripper head 34 of the pallet loader 7, shaped if necessary and set down on the pallet 6 and/or the layer 5 situated therein. This operating cycle is repeated until the desired number of layers is on the pallet 6. During this procedure only the conveyor zone 8 but not the buffer 9 is functioning.

Figure 4:
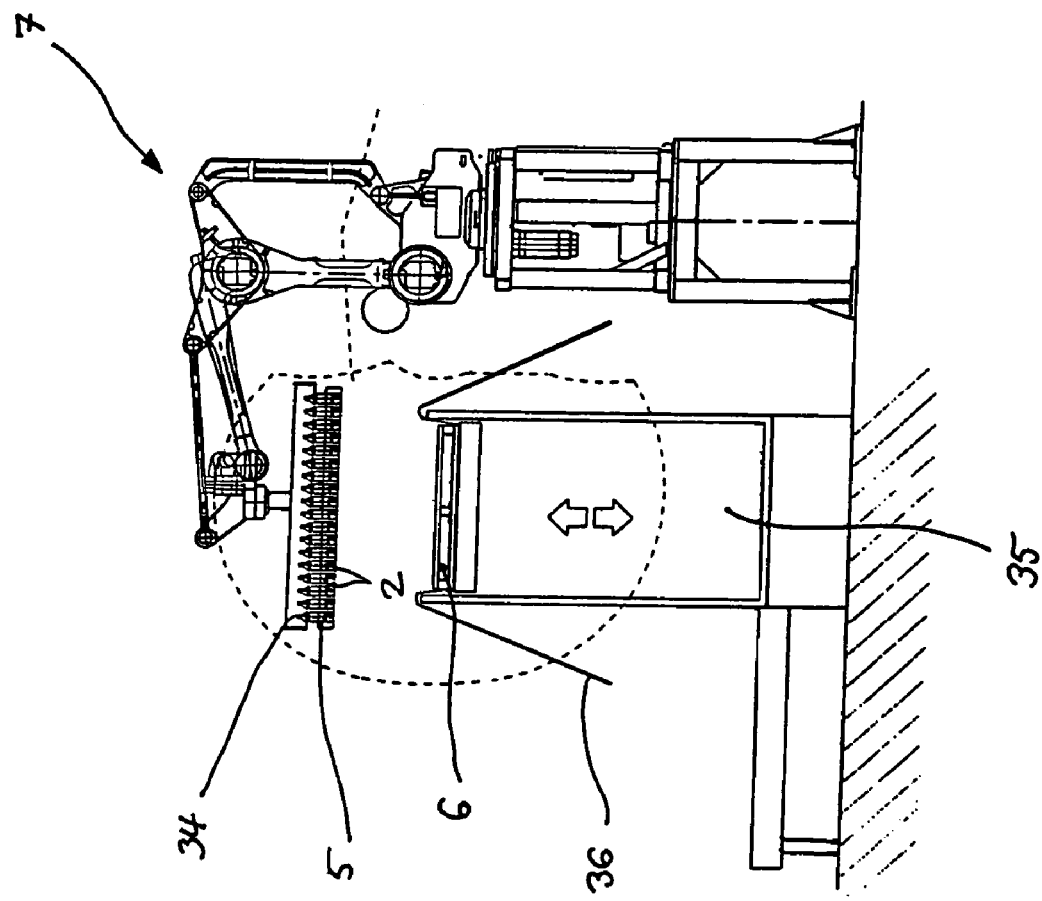
FIG. 4 shows a schematic side view of the pallet loader according to FIGS. 1 and 2.
Figure 5:
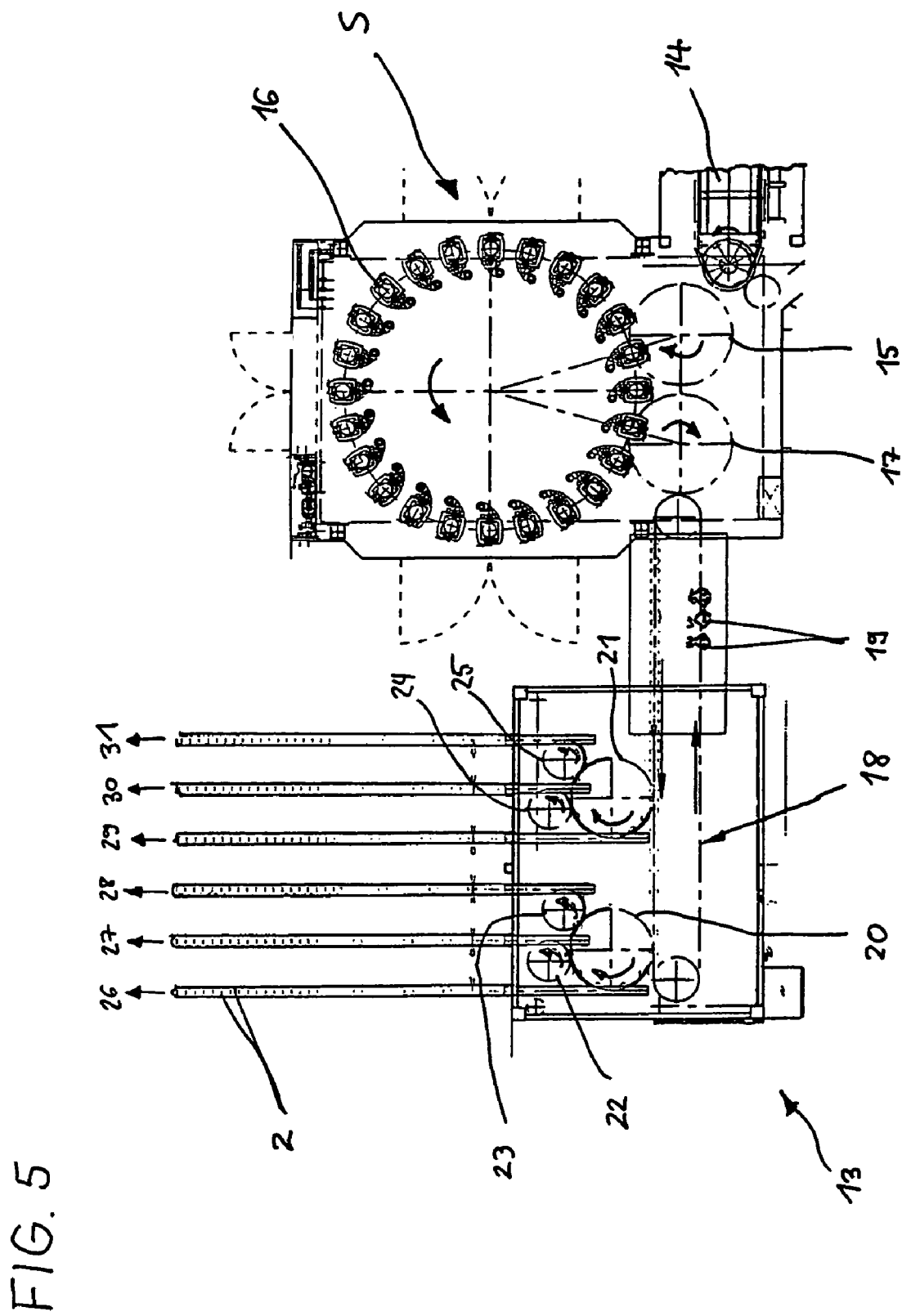
FIG. 5 shows a schematic view of the distributor device from above.

Then by closing the safety strip 36 the pallet 6 with its load is secured, removed from the lifting gear 35 and a new empty pallet is moved into the starting position shown in FIG. 4. Meanwhile the pallet loader 7 is standing while the transposing device 4 continues to operate. The layers 5 now formed are not set down on sliding table 12, however, but instead are placed on the carriage tin due to the lengthened set-down stroke (H) with the sliding table 12 assuming its end position on the right. Then the carriage 10 is shifted by one layer's width. This operating cycle is repeated until the pallet change is completed and the pallet loader is again ready for use and is removing the first layer for the new pallet from the sliding table 12 or the buffer 9. The pallet loader 9 is now working together alternately with the sliding table 12 and the carriage 10, i.e., it alternately takes layers 5 from the conveyor zone 8 and from the buffer 9. This makes use of the fact that the transposing device 4 needs a certain amount of time until it is filled with the number of bottles 2 required for a complete layer. During this period of time, the sliding table 12 may already be moved beneath the transposing device 4 and the gripper head 34 of the pallet loader 7 has free access to the layers 5 on the carriage 10. As soon as this alternate removal of layers 5 from the conveyor zone 8 and/or from the buffer 9 is concluded, the layers 5 are removed only from the sliding table 12 until the pallet 6 is completely full. Then more layers are again inserted into the buffer in the manner described above.

Thus, with a low additional expenditure for the buffer 9, which is situated at a lower level for complete layers 5, the inventive device permits continuous operation of the blow molding machine S without the complex bottle buffers in the form of pneumatic conveyors, drum storage devices, upright shelving, etc. that was conventionally used in the past.

The buffer 9 may also be situated at the same height as the conveyor zone 8 and next to it, in which case the strip grippers 32 and the gripper head 34 must then execute an additional movement to remove and/or set down the layers in the horizontal direction. With the linear and robot drives customarily in use today, this can be implemented with no problem. Other possibilities are also conceivable for the design of the buffer itself. For example, it may be arranged in a circular pattern around the pallet loader 7 or formed by an endless pocket chain.

Figure 6:
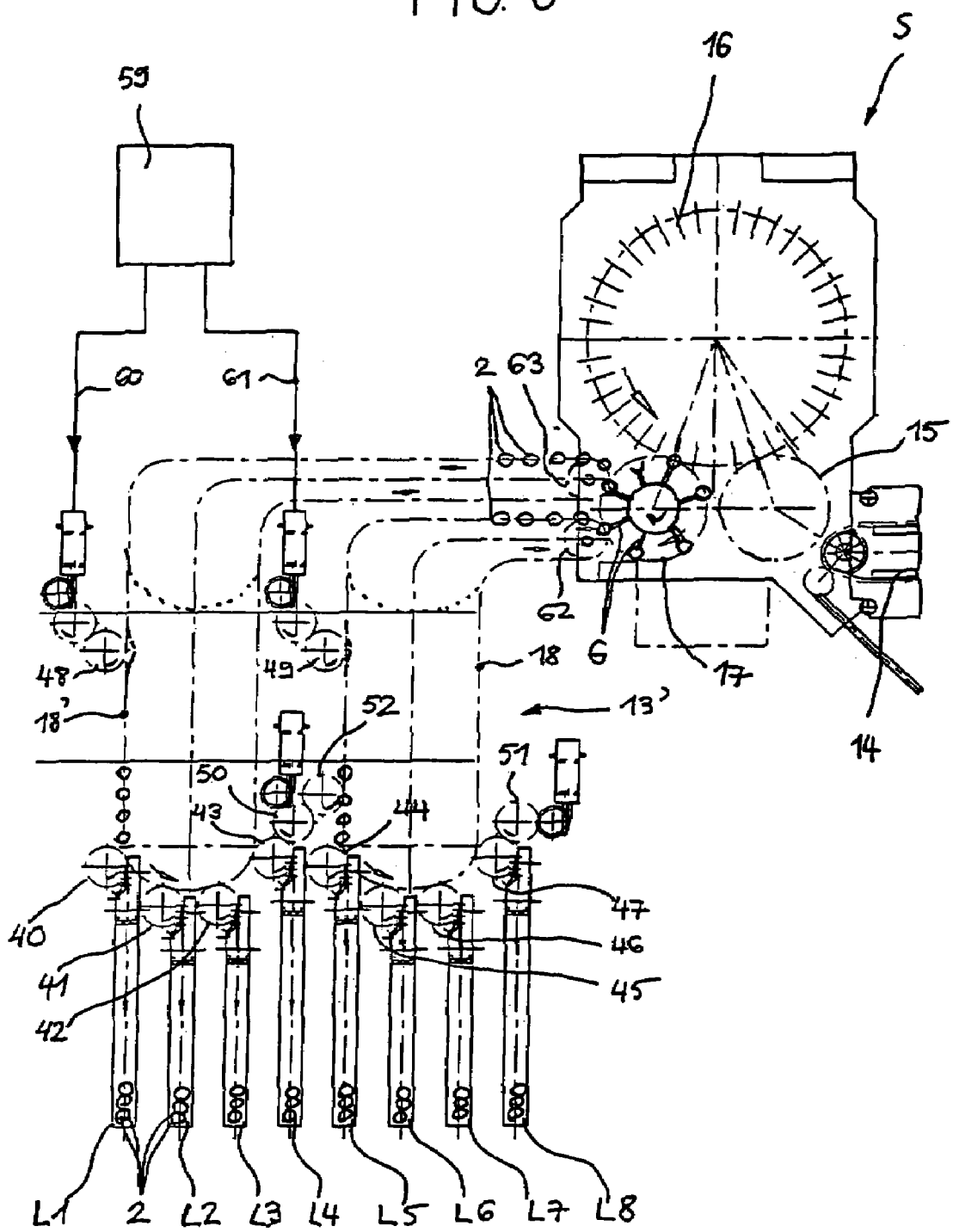
FIG. 6 shows a schematic view of a variant of the distributor device from above.
Figure 8:
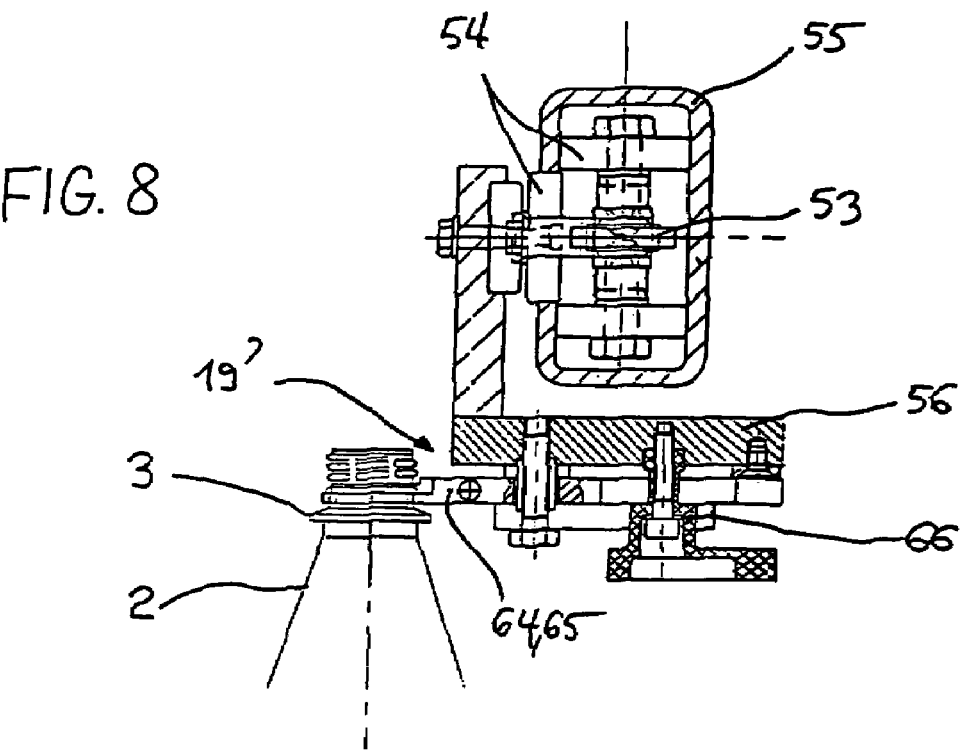
FIG. 8 shows section AB according to FIG. 7.
Figure 7:
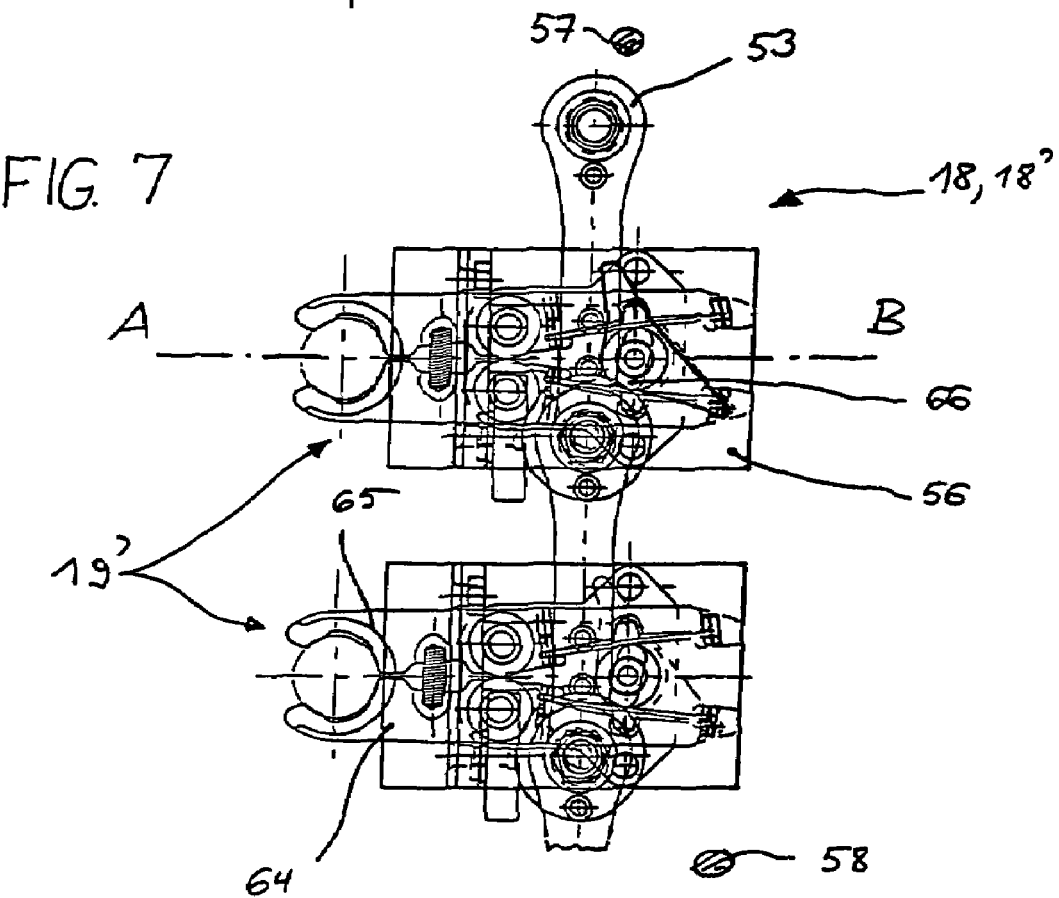
FIG. 7 shows an enlarged view of part of the conveyor chain according to FIG. 6 as seen from above.

The distributor 13' according to FIGS. 6 through 8 has two endless conveyor chains 18, 18' which cooperate directly with the discharge star wheel 17 of the blow molding machine S in synchronization. More precisely, the two conveyor chains 18, 18' both come in contact with the discharge star wheel 17 in the deflection area of their drive wheels 62, 63 one after the other and are alternately loaded with freshly blow-molded bottles 2 by its controllable gripper arms G.

As shown in FIGS. 7 and 8, the two conveyor chains 18, 18' each have an endless link chain 53 which is guided by horizontal and vertical rollers 54 in a C-shaped guidance profile 55 with a lateral opening on a closed path. Each conveyor chain 18, 18' has a plurality of individually controllable gripper tongs 19' by means of mounting angles 56; details of the design of the gripper tongs can be found in Unexamined European Patent EP 939 044 A1. The gripper tongs 19' comprising two pivotable gripper arms 64, 65 may be opened and/or closed at any point in the revolving path of the conveyor chains 18, 18' by rotating their control cams 66 by means of stationary control pins 57, 58, only two of which are shown here.

As FIG. 6 shows, the two conveyor chains 18, 18' have angular interconnected movement paths having a curved path at the deflection remote from the discharge star wheel 17. Four clamping star wheels 40 through 47 rotating in synchronization with the conveyor chains 18, 18' are each situated on this curved path of each conveyor chain 18, 18'. The design of these clamping star wheels is described in detail in European Patent 726 216 B2. The clamping star wheels 40 through 47 are controlled in such a way that they remove every fourth bottle 2 from the respective conveyor chain 18, 18' and feed it into a directly downstream conveyor path in the form of a pneumatic conveyor L1 through L8. Thus a total of eight conveyor paths are formed, with ⅛ of the bottles 2 output by the blow molding machine S being supplied from them to a transposing device (not shown here).

During normal operation, the two conveyor chains 18, 18' are each driven in synchronization with the blow molding machine S at half speed. The distributor 13' may also operate when the blow molding machine is turned off, however. To do so, an input clamping star wheel 48, 49 that can be driven in synchronization with the conveyor chain 18, 18' is assigned to each conveyor chain 18, 18' in the revolving area in front of the discharge clamping star wheels 40 through 47, so that the bottles 2 supplied from a silo 59 by means of pneumatic conveyors 60, 61 or the like can be introduced onto the conveyor, distributed and palletized. This is expedient if a number of bottles 2 that have already been manufactured previously are to be palletized. Two other feed clamping star wheels 50 and 51 are assigned to every fourth discharge clamping star wheel 43 and/or 47 of the conveyor chains 18, 18'. With the help of the feed clamping star wheels 50, 51, and the finished bottles which are fed into the distributor 13 on resuming operation after a standstill of the palletizing system 1 until a delayed standstill of the blow molding machine S and which cannot be accommodated in the buffer shown here can be fed into the distributor 13' on resuming operation, whereby the blow molding machine S can be in active production at the same time. Until the buffer (not shown here) has been emptied, the freshly manufactured bottles 2 are removed from the conveyor chains 18, 18' by stars 40 through 42 and 44 through 46 which are controlled accordingly. The flexibility of the device is thereby increased significantly.

The same thing is also true of the transfer device formed by another clamping star wheel 52 together with the feed clamping star wheel 50 by means of which bottles 2 can be transported from the conveyor chain 18 to the conveyor chain 18' and/or their output clamping star wheel 43 as needed. This is important if an uneven number of, for example, seven rows of bottles is to be formed. In this case, a uniform loading of all seven conveyor belts may be ensured by the transfer device 52.

It should also be mentioned that due to the curved convex path of the conveyor chains 18, 18' in the area of the output clamping 40 through 47, advantageous transitional relationships between the conveyor chains 18, 18' and the clamping star wheels are formed. A concave path is also possible, as indicated with dotted lines in the area of the feed clamping star wheels 48, 49.

If the feed star wheels 48 through 51 and the respective pneumatic conveyors or the like are omitted, then the curved path can be brought closer to the blow molding machine S, as indicated with dotted lines, and the length of the conveyor chains 18, 18' can therefore be shortened significantly.

We claim:

1. Device for palletizing empty plastic bottles having a neck collar, comprising:
   a transposing device for forming layers of plastic bottles that are fed in rows,
   a pallet loader for transferring the layers,
   a conveyor zone situated between the transposing device and the pallet loader wherein the conveyor zone is a sliding table for a layer and the table is movable between a normal parking station of the transposing device and a normal receiving station of the pallet loader, and
   a buffer for intermediate storage of at least one layer, wherein the transposing device loads layers of plastic bottles to the conveyor zone or to the buffer and wherein the pallet loader picks up the layers of plastic bottles from either the conveyor zone or the buffer and the buffer has a reversible carriage for receiving at least one layer of plastic bottles.

2. Device according to claim 1, wherein the buffer is arranged at least partially beside the conveyor zone.

3. Device according to claim 1, wherein the buffer is arranged at least partially beneath the conveyor zone.

4. Device according to claim 1, wherein the buffer has at least one endless conveyor chain for receiving at least one layer of plastic bottles.

5. Device according to claim 1, wherein the buffer is provided with supports for the plastic bottles.

6. Device according to claim 5, wherein the supports are adjustable for adaptation to different diameters of the plastic bottles.

7. Device according to claim 1, wherein the buffer is arranged beneath the sliding table and passes by an additional parking station of the transposing device as well as an additional receiving station of the pallet loader.

8. Device according to claim 7, wherein the transposing device and the pallet loader one of execute an additional stroke during which they set down the plastic bottles on the buffer or pick up the plastic bottles from the buffer.

9. Device according to claim 1, and a distributor connected upstream from the transposing device continuously shapes several rows of plastic bottles from an incoming row of plastic bottles.

10. Device for palletizing empty plastic bottles having a neck collar, comprising
 a transposing device for forming layers of plastic bottles supplied in rows,
 a pallet loader transferring the layers of plastic bottles to pallets,
 a conveyor zone arranged between the transposing device and the pallet loader for the layers of plastic bottles formed by the transposing device, and
 a distributor which is provided upstream from the transposing device continuously forms several outgoing rows of plastic bottles from an incoming row of plastic bottles, wherein the distributor has a continuously revolving conveyor chain for a single-row feed of plastic bottles, a plurality of clamping star wheels revolving in synchronization being connected one of directly or indirectly downstream from the conveyor chain, removing the plastic bottles individual from the conveyor chain and distributing them among multiple paths.

11. Device according to claim 10, wherein the distributor has multiple continuously revolving conveyor chains for a single row supply of plastic bottles, several clamping star wheels being connected one of directly or indirectly downstream from each, individually removing the plastic bottles from the conveyor chains and distributing them among multiple paths.

12. Device according to claim 11, wherein the conveyor chains form a tangent to the discharge star wheel of a blow molding machine and are loaded alternately with plastic bottles by the controllable gripper arms of the discharge star wheel.

13. Device according to claim 11, wherein each of the conveyor chains is equipped with individually controllable gripper tongs for targeted gripping and release of one plastic bottles at a time.

14. Device according to claim 11, wherein each of the conveyor chains has a curved path in the transfer area to the clamping star wheels.

15. Device according to claim 11, and at least one clamping star wheel that can be driven in synchronization is provided for one of at least one conveyor chain or at least one clamping star wheel for input plastic bottles from a storage device into one of the conveyor chain or into the clamping star wheels.

16. Device according to claim 11, and a transfer device for transferring plastic bottles between one of the conveyor chains or the clamping star wheels assumed to them.

17. Device for palletizing empty plastic bottles having a neck collar, comprising:
 a transposing device for forming layers of plastic bottles that are fed in rows,
 a pallet device for transferring the layers,
 a conveyor zone situated between the transposing device and the pallet loader wherein the conveyor zone is a sliding table for a layer and the table is movable between a normal parking station of the transposing device and a normal receiving station of the pallet loader, and
 a buffer for intermediate storage of at least one layer, wherein the transposing device loads layers of plastic bottles to the conveyor zone or to the buffer and wherein the pallet loader picks up the layers of plastic bottles from either the conveyor zone or the buffer, wherein the buffer is provided with supports for the plastic bottles, and wherein the supports are adjustable for adaptation to different diameters of the plastic bottles.

18. Device according to claim 17, wherein the buffer is arranged at least partially beside the conveyor zone.

19. Device according to claim 17, wherein the buffer is arranged at least partially beneath the conveyor zone.

20. Device according to claim 17, wherein the buffer has at least one endless conveyor chain for receiving at least one layer of plastic bottles.

* * * * *